C. C. NEISWANDER.
AEROPLANE.
APPLICATION FILED FEB. 25, 1918.
1,295,571.
Patented Feb. 25, 1919.
2 SHEETS—SHEET 1.
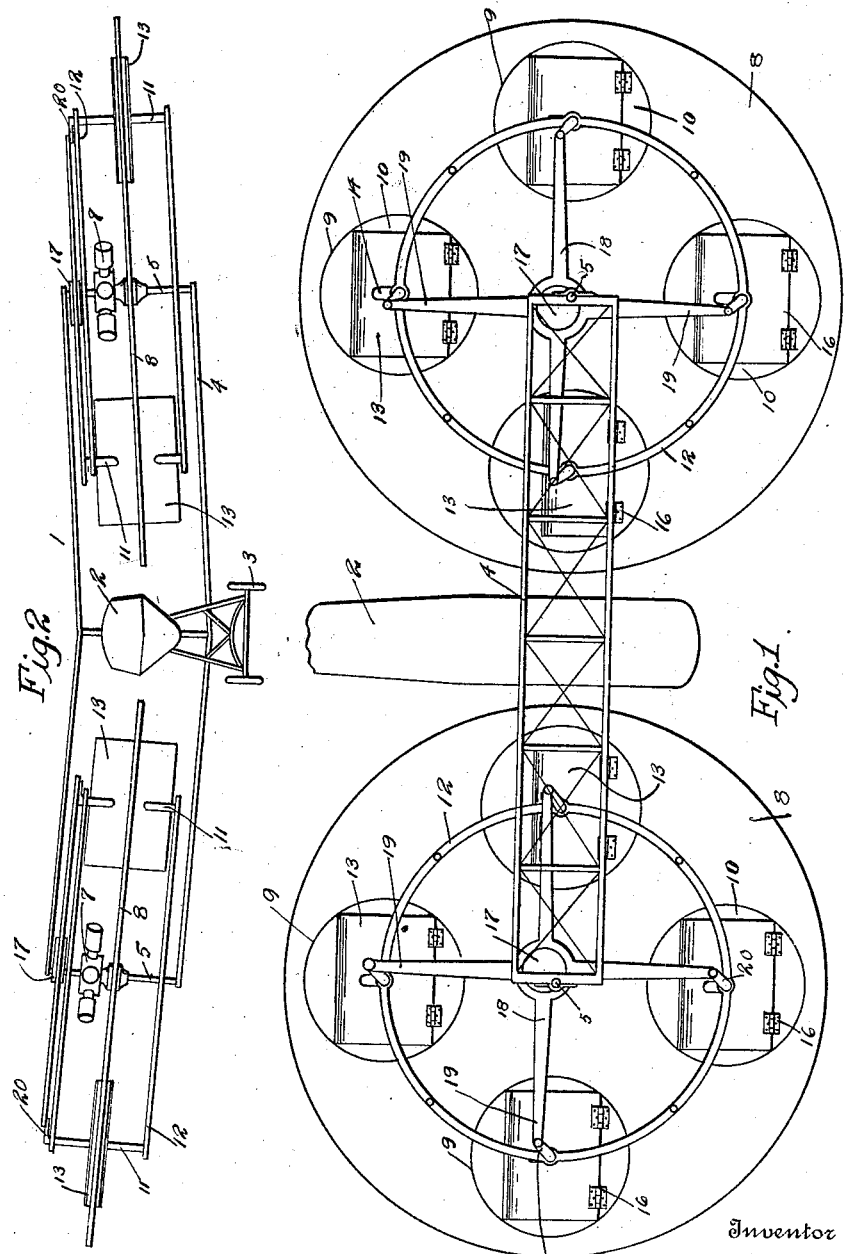
Witness
A. G. Sundell
Inventor
Clyde C. Neiswander
By
C. C. Shepherd
Attorney C. C. NEISWANDER.
AEROPLANE.
APPLICATION FILED FEB. 25, 1918.
1,295,571.
Patented Feb. 25, 1919.
2 SHEETS—SHEET 2.
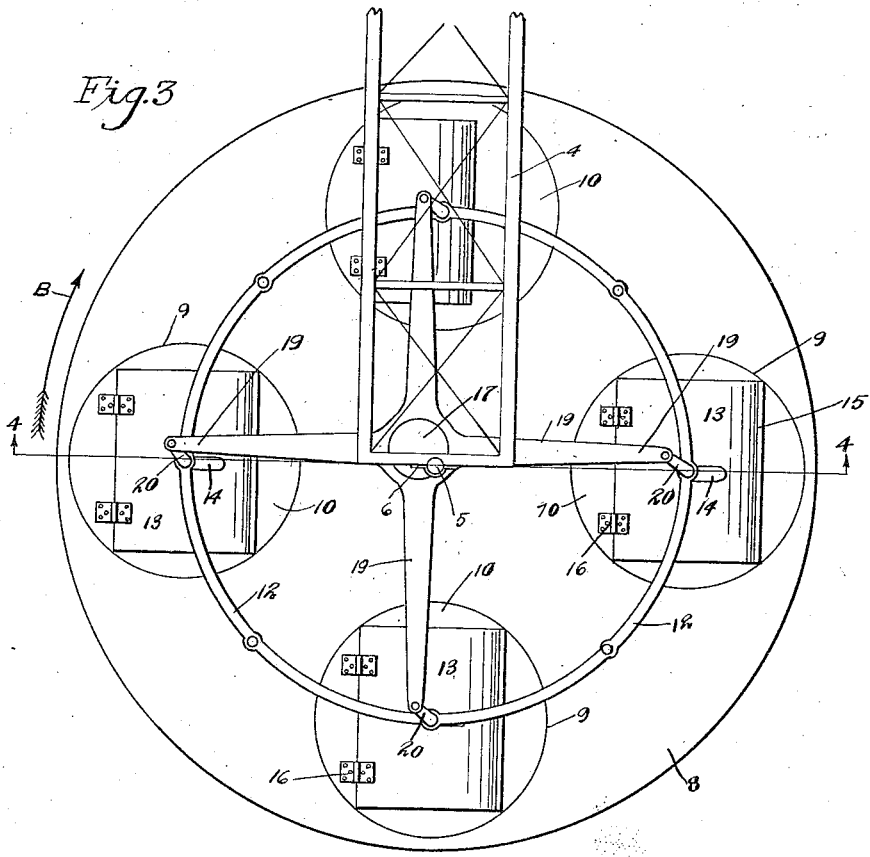
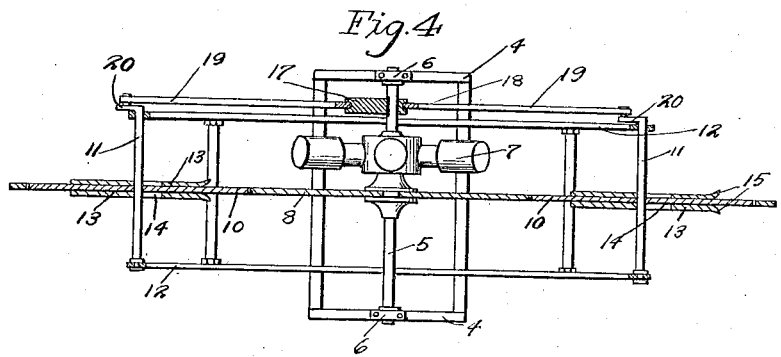

UNITED STATES PATENT OFFICE.

CLYDE C. NEISWANDER, OF EAST COLUMBUS, OHIO.

AEROPLANE.

1,295,571.  Specification of Letters Patent.  Patented Feb. 25, 1919.

Application filed February 25, 1918. Serial No. 219,126.

*To all whom it may concern:*

Be it known that I, CLYDE C. NEISWANDER, a citizen of the United States, residing at East Columbus, in the county of Franklin and State of Ohio, have invented certain new and useful Improvements in Aeroplanes, of which the following is a specification.

This invention relates to aeroplanes, and has for its primary object to produce an improved form of heavier than air machine wherein is embodied a plane structure of novel and improved design.

To this end, the invention comprises, among other features, an aeroplane having a laterally extending frame, upon which is mounted a plurality of spaced stationary shafts, the latter having rotatably mounted thereon suitable forms of rotary engines, which carry circular revoluble planes, whereby during the operation of the aeroplane said planes are capable of rotating about said shafts at relatively high speeds, and thus serve to exert a gyroscopic influence upon the aeroplane as a whole, so that stability and unwavering flight of the latter will be effected.

A further object of the invention resides in providing the main rotatable planes with a plurality of circularly arranged openings, in which are mounted a plurality of disk members, means being provided in conjunction with said members to permit of their rotary movement about the axes of said planes but to prevent their own axial rotation within said openings, whereby said members will be maintained in substantially fixed positions which will not be subject to change by the rotation of the main planes, and to provide in connection with said disk members a plurality of thrust imparting or propelling planes of peculiar formation and operation, which latter in their preferred form are keyed to the disk members, so that while revolving in connection with the main plane the same will be constantly and properly positioned to receive the effects of wing pressure and to impart propelling force to the aeroplane by virtue of the action of the substantially non-rotating disk members.

For a further disclosure of the invention, reference is to be had to the following description and to the accompanying drawings, forming a part of this specification, and in which similar characters of reference denote corresponding parts throughout the several views thereof.

In the drawings:

Figure 1 is a top plan view of an aeroplane constructed in accordance with the principles of the invention.

Fig. 2 is a front elevation thereof.

Fig. 3 is an enlarged top plan view of the rotatable plane structure utilized by the invention.

Fig. 4 is a vertical sectional view taken along the line 4—4 of Fig. 3.

Referring more particularly to the drawings, the aeroplane 1, comprising the invention includes the usual fuselage 2 of any desired construction or proportion, the same in this instance including a landing chassis 3, however, it will be understood that an ordinary hydroplane body may be substituted for the form of fuselage shown.

The aeroplane 1 is constructed along helicopter principles, and consists of a dihedral frame 4, which frame may be of any desired construction and is braced in any suitable manner. Carried by the outer ends of the frame 4 are a plurality of shafts 5, the latter being stationarily journaled in bearings 6, fixed to the ends of the frame 4. Surrounding each of the shafts 5 is a rotary motor 7, which has suitably connected therewith a circular sustaining plane 8, the latter being, of course, rotatable about its shaft 5 and is adapted to rotate in unison with the motor 7.

The planes 8 may be constructed in any desired manner and from any suitable material, and it will be understood that the substantially solid construction shown in Fig. 4 of the drawing is not essential and merely serves as a vehicle for illustrating the invention. Circularly formed in each of the planes 8, are a plurality of circular openings 9, and in which are non-rotatably positioned a plurality of disk members 10, the latter being of substantially the same thickness as the main planes 8.

The members 10 are carried by a plurality of axially disposed shafts 11, which shafts are mounted within spaced bearing rings 12 rotatable about the stationary shafts 5. Thus it will be manifest that the rotation of the motors 7 will result in uniform rotation of the planes 8 and their associated disk members 10 and bearing rings 12, and thus the rotation of the structure described produces a substantially gyroscopic action on the aeroplane 1, and produces a stabilizing influence of an efficient character.

In order to provide propelling means for the aeroplane, the members 10 are provided along the upper and lower surfaces with a plurality of pivoted or hinged propelling planes 13, which latter are adapted at predetermined points to spread outwardly so as to provide thrust producing surfaces, the latter being employed in order to affect the propulsion of the aeroplane. These planes 13, normally extend in parallel relation with the members 10 in the manner shown in Fig. 4, however, when the planes 8 are revolving in the direction of the arrow B, said propelling planes will, upon nearing the fuselage 2, be spread to their open or extended positions, thereby providing surfaces which will tend to pocket the wind and provide reliable and efficient means for forcing the aeroplane forward, said planes 13 being in an open position when the main planes 8 are passing through approximately 90 degrees of their complete orbit of travel.

It will be noted that said planes 13 are automatically opened and closed by the action of wind pressure thereon, thus assuring their automatic operation. Slots 14 are formed in the planes 13 in order that the shafts 11 may pass therethrough, the ends of said slots also serving to limit the outwardly or spreading movement of said planes. If desired, certain edges of the planes 13 may be flared as at 15, so that the operation of the wind thereon will assure their opening and closing.

In order to insure the operation of the planes 13 at desired predetermined positions, that is, where their use will be the most effective, it is essential that said members 10 be prevented from rotating axially during the rotating of the main planes 8. This will tend to retain the planes 13 in substantially the same positions as regards the length of the aeroplanes 1, that is, with the hinged edges 16 of said propelling planes, so disposed that the same always face the forward portion of said aeroplane. This construction will assure the opening or spreading of said planes 13, at positions substantially contiguous to body of said aeroplanes, this position being calculated to produce the maximum thrust or propelling force to the machine. One desired method for preventing the rotation of the shafts 11 is to provide each of the mounted shafts 5 with a fixed eccentric member 17, which member is annularly grooved for the reception of the hub portion of a spider 18, the latter including radially extending arms 19, which are pivotally connected at their outer ends to crank elements 20, the latter being mounted upon the upper ends of the shafts 11. Thus it will be manifest that by virtue of the eccentrically disposed spiders 18, rotatable about the fixed eccentrics 17, that the crank elements 20 will be constantly maintained in the parallel relation shown, so that the axial rotation of the disk members 10 and the planes 13 will be effectively prevented.

As stated before, this desired non-rotatable construction of the disk members will effectively serve to retain the propelling planes in such positions that the same will open at suitable intervals to effect a desired propulsion of the aeroplane 1, and it is calculated that the planes will propel said aeroplane at a greater speed than that which is obtainable by the screw propellers now in common service.

From the foregoing, it will be apparent that there is provided mechanism whereby the objects of the invention have been achieved, and that all of the desirable features of stability and propulsion above mentioned are, among others, present. The mechanism employed by the machine is relatively simple in construction, and is not likely to become out of order or to require unusual repairs. The operation of the propelling planes is substantially automatic and will require but little manual attention. By reason of the construction of the planes described, it is claimed that the same will produce greater speed than is obtainable with the screw propellers now in use, and also, a high degree of stability, due to the effect of the swiftly revolving mass including the rotary engines and their associated planes.

Having described the invention what is claimed is:

1. In an aeroplane, the combination with the body and frame thereof, of a shaft carried by said frame, an engine rotatable about said shaft, a sustaining plane rotatively connected with said engine, and a plurality of propelling planes hingedly connected with the upper and lower surfaces of said plane.

2. In an aeroplane, the combination with the body and frame thereof, of a plurality of spaced rotatable sustaining planes, carried by said frame and having a plurality of circularly arranged openings formed therein, members situated between said openings, propelling planes hinged to said members and means for preventing said members from rotating axially during the rotation of said sustaining planes.

3. In an aeroplane, the combination with the body and frame thereof, of a plurality of spaced rotatable sustaining planes carried by said frames and having a plurality of circularly arranged openings formed therein, disks situated within said openings, a motor carried by each of said planes and rotatable about stationary shaft, a frame rotatably carried by each of said stationary shafts, shafts carried by said latter frames and serving to support said disks, crank arms mounted upon the upper extremities of said disk shafts, eccentrics secured to each of said motor shafts, and armed members rotatable about said eccentrics and having the outer ends thereof connected with said crank arms, whereby axial rotation of said disks will be prevented.

4. In an aeroplane, the combination with the body and frame thereof, of a plurality of spaced rotatable sustaining planes carried by said frames and having a plurality of circularly arranged openings formed therein, disks situated within said openings, a motor carried by each of said planes and rotatable about the stationary shafts, a frame rotatably carried by each of said stationary shafts, shafts carried by said latter frames and serving to support said disks, crank arms mounted upon the upper extremities of said disk shafts, eccentrics secured to each of said motor shafts, armed members rotatable about said eccentrics and having the outer ends thereof connected with said crank arms, whereby axial rotation of said disks will be prevented, and a plurality of pivoted propulsion planes carried by said disks and capable of assuming open positions when the same are adjacent to said body.

In testimony whereof I affix my signature in presence of two witnesses.

CLYDE C. NEISWANDER.

Witnesses:
W. T. LEFFLER,
F. A. WOLF.

Copies of this patent may be obtained for five cents each, by addressing the "Commissioner of Patents, Washington, D. C."